United States Patent [19]

Kondo et al.

[11] 4,002,376

[45] Jan. 11, 1977

[54] ANTI-SKID BRAKE CONTROL ASSEMBLY

[75] Inventors: Toshiyuki Kondo, Toyota; Masamoto Ando, Toyohashi, both of Japan

[73] Assignee: Aisin Seiki Kabushiki Kaisha, Kariya, Japan

[22] Filed: Oct. 22, 1975

[21] Appl. No.: 624,582

[30] Foreign Application Priority Data

Nov. 12, 1974 Japan ............................ 49-130223

[52] U.S. Cl. ................................................. 303/115
[51] Int. Cl.² ........................................... B60T 8/02
[58] Field of Search ........ 91/33; 188/181 A, 181 C; 303/12, 31, 115

[56] References Cited

UNITED STATES PATENTS

| 3,467,441 | 9/1969 | Clark et al. | 303/21 F M |
| 3,556,609 | 1/1971 | MacDuff | 303/21 F M |
| 3,920,279 | 11/1975 | Inada et al. | 303/115 |

Primary Examiner—Duane A. Reger
Attorney, Agent, or Firm—Pierce, Scheffler & Parker

[57] ABSTRACT

An anti-skid brake control assembly for controlling brake pressure which is first quickly reduced when a skid condition occurs or is about to occur and in which the reduced brake pressure is restored to resume the braking operation. During restoration of the braking pressure, the pressure is first rapidly increased and then more gradually increased thus preventing a skid condition from being repeated rapidly.

3 Claims, 5 Drawing Figures

// FIG. 4
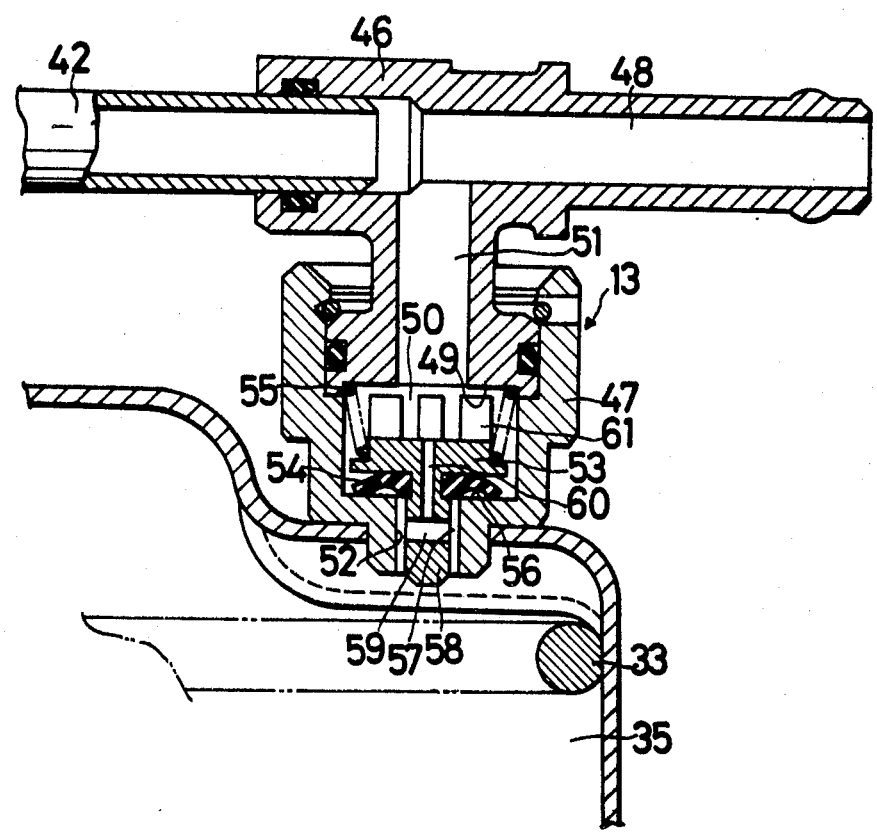

ANTI-SKID BRAKE CONTROL ASSEMBLY

BACKGROUND OF THE INVENTION

1. Field of the Invention

The present invention relates to anti-skid brake control assemblies for vehicles, and more particularly to an improved anti-skid brake control assembly which includes a one-way valve.

2. Description of the Prior Art

In an anti-skid brake control assembly which reduces and then restores the brake pressure to prevent a wheel of a vehicle from being locked due to an excessively strong braking action, it has been desired that, in order to prevent the wheel from being rapidly locked again by the brake pressure-restoring operation, variation of the pressure rise in the wheel cylinder is rapid at the commencement of the pressure restoring operation and after that becomes gradually slower. In a conventional anti-skid brake control assembly, to provide the above-described characteristic of variation of the pressure rise in the wheel cylinder during the brake pressure-restoring operation, an electromagnetic-type throttle valve has been used in a chamber of an actuator for controlling the pressure in the wheel brake cylinder. However, the use of the electromagnetic-type throttle valve results in a complex construction as well as the consumption of large quantities of electricity.

SUMMARY OF THE INVENTION

Therefore, it is an object of this invention to provide an improved anti-skid brake control assembly which is mechanically simple and inexpensive to manufacture.

It is another object of the present invention to provide an improved anti-skid brake control assembly which consumes very little electricity.

It is another object of the present invention to provide an improved anti-skid brake control assembly capable of preventing a vehicle wheel from being rapidly locked again by the brake pressure-restoring operation.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 4 is an enlarged cross-sectional view of a one-way valve illustrated in FIG. 1.

DETAILED DESCRIPTION OF THE INVENTION

Figure 1:
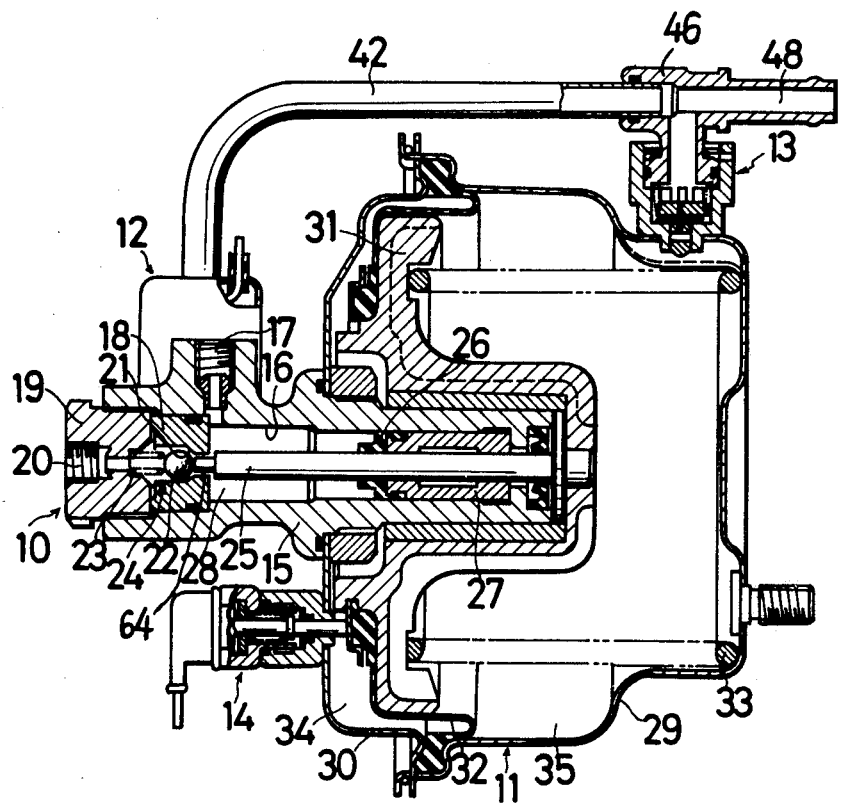
FIG. 1 is an elevational view partly in cross-section of an anti-skid brake control assembly according to the present invention.

Outlining a preferred embodiment of the present invention in reference to the drawings, the assembly comprises a hydraulic controller 10 for decreasing the hydraulic pressure supplied by a master cylinder to the wheel brake cylinders when locking of the vehicle wheels occurs, the controller 10 including a cut-off valve device and a capacity controller therein, a servomotor 11 to regulate the controller 10, an electromagnetic valve 12 to operate the servomotor 11, and a one-way valve 13 to control the servomotor 11. The assembly further includes a check-switch 14 for confirming the operation of the servomotor 11.

Referring now to FIG. 1, the controller 10 comprises a housing 15 provided therein with a differential cylindrical bore 16. The housing 15 includes an outlet port 17 drilled thereon, the port 17 being in communication with conventional wheel cylinders (not shown). A guide member 18 is hermetically installed within the bore 16 which is closed by a plug 19 being threaded over the guide member 18. The plug 19 includes an inlet port 20 drilled therein which is in communication with a conventional master cylinder (not shown). The guide member 18 is provided with a valve seat 21 for a valve ball 22. A spring 23 is interposed between the ball 22 and the right end of the plug 19 to normally bias the valve ball 22 rightward in the figure. A projection at the left end of a plunger 25 is able to go through a central axial through hole 64 of the guide member 18 and may contact the valve ball 22 so as to prevent the ball 22 from seating on the valve seat 21. The valve seat 21, the valve ball 22, the spring 23 and the plunger 25 cooperate to form a cut-off valve 24. The plunger 25 is slidably supported within the bore 16 by a seal member 26 and a plunger guide member 27 which are fixed to the bore 16 of the housing 15. A pressure chamber 28 is defined by the guide member 18, the plunger 25 and the seal member 26 within the bore 16.

The servomotor 11 comprises casings 29 and 30 which are secured to each other by way of a conventional fastening means (not numbered) and include therein a diaphragm piston 31, the piston 31 being provided with an annular diaphragm 32 at the outer periphery thereof. The outer end portion of the diaphragm 32 is secured between the casings 29 and 30. A spring 33 is provided to bias the piston 31 leftward in the figure. The interior of the servomotor 11 is divided into two hermetic chambers, a first chamber 34 and a second chamber 35, by means of the piston 31. The diaphragm piston 31 is engageable with the right end of the plunger 25 in the figure. Thus, when there is no pressure difference between the chambers 34 and 35, the piston 31 is urged leftward in the figure by the action of the spring 33 such that the plunger 25 is also urged leftward in the figure to thereby remove the valve ball 22 from the valve seat 21 against the spring 23, whereby communication between the inlet port 20 and the outlet port 17 is opened through the pressure chamber 28. The piston 31 is urged rightward in the figure against the action of the spring 33 when the pressure in chamber 34 is greater than that in chamber 35 and the plunger 25 is also moved rightward by pressure in the pressure chamber 28 to separate the projection at the end of the plunger 25 from the valve ball 22, whereby the valve ball 22 contacts with the valve seat 21 by the spring 23. Consequently the communication between the inlet port 20 and the outlet port 17 is interrupted.

Figure 2:
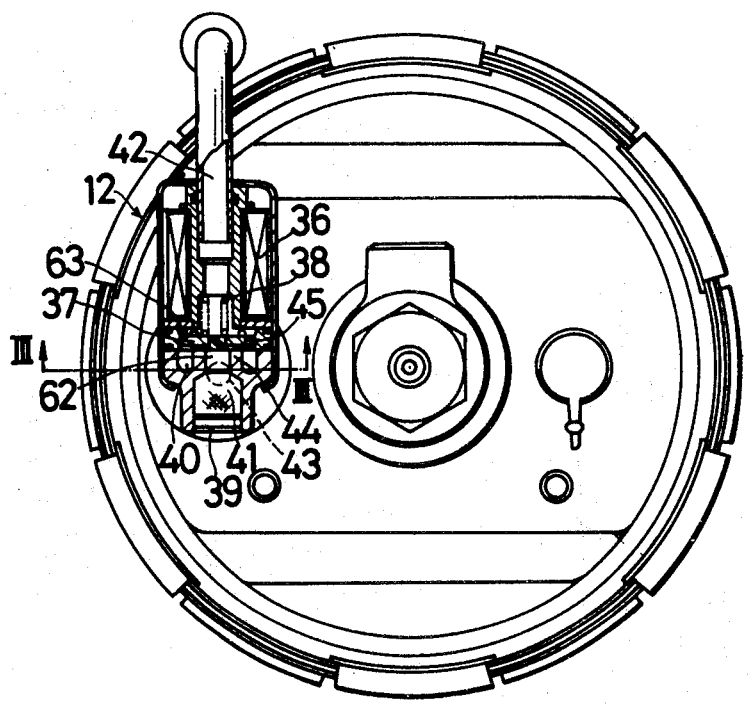
FIG. 2 is an elevational view partly in cross-section of an electromagnetic value of the assembly illustrated in FIG. 1.
Figure 3:
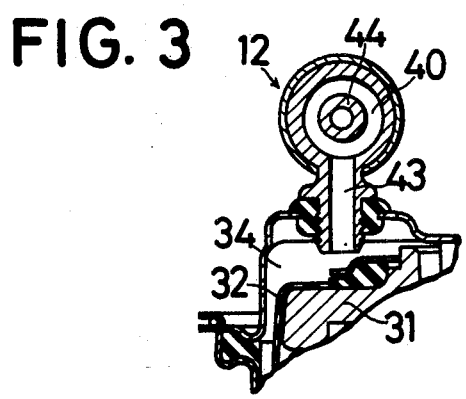
FIG. 3 is a cross-sectional view taken along the line III—III of FIG. 2.

With regard now to FIG. 2 and 3, there is shown the electromagnetic valve 12 including a solenoid 36 connected to a conventional electrical skid detector (not shown), a valve 37 and a spring 38 for normally urging the valve 37 downward against valve seat 44 in FIG. 2.

An atmospheric air inlet port 39 which introduces atmospheric air communicates with a valve chamber 40 through an air cleaner 41 and the valve 37, and a pipe or conduit 42 which is connected to a vacuum source such as for example an intake manifold (not shown) also communicates with the valve chamber 40 through the valve 37. The valve chamber 40 always communicates with the first chamber 34 (FIG. 3) of the servomotor 11 through a passage 43. When skidding of a predetermined degree is sensed by the detector, the solenoid 36 is energized by a signal generated by the detector so as to attract the valve 37 upwardly in FIG. 2 against the spring 38. Thus, the valve 37 separates from a valve seat 44 to open a valve port 62 and comes in contact with a valve seat 63 such that the communication between the conduit 42 and the valve chamber 40 is interrupted, while communication between the air inlet port 39 and the valve chamber 40 is established. In normal condition, the valve 37 is urged onto the valve seat 44 by the biasing force of the spring 38 such that the communication between the air inlet port 39 and the valve chamber 40 is interrupted, while the valve chamber 40 communicates with the conduit 42 through a hole 45 provided within the valve 37.

With regard to FIG. 4, there is shown the one-way valve 13 which is interposed between the conduit 42 and the second chamber 35. The one-way valve 13 includes a duct 46 provided with a lateral passage 48 which is connected to the conduit 42 and the vacuum source and a casing 47 which with the duct 46 defines a chamber 50 at the lower end surface 49 of the duct 46.

The chamber 50 is in communication with the passage 48 through a vertical passage 51 provided within the duct 46 and is communicatable with the second chamber 35 through a vertical hole 52 provided within the casing 47, a valve 53 and a seat 54 secured to the valve 53 disposed within the chamber 50. The valve 53 and the seat 54 are normally urged downward by a spring 55 so as to keep the seat 54 on a seat surface 56 of the casing 47 as shown in the figure.

In this condition, the second chamber 35 is in communication with the chamber 50 through a gap 57 between an interior wall of the hole 52 and an outer surface of stem portion 58 of the valve 53 which is loosely inserted into the hole 52, a lateral passage 59 provided within the stem portion 58 and an orifice 60 provided within the valve 53. When pressure prevailing in the passage 48, i.e. in the conduit 42, is lower than that in the second chamber 35, then the valve 53 is displaced upwards from the position as shown in FIG. 4 against the biasing force of the spring 55, thereby diverting the seat 54 from the seat-surface 56, whereby the second chamber 35 is directly communicated with the chamber 50 through the gap 52. Stopper members 61 are provided on the upper end surface of the valve 53 in order to limit the upward displacement of the valve 53 by contacting the stopper members 61 with the lower end surface 49 of the duct 46.

The operation of the present system constructed as described above is as follows.

In normal braking operation, the electrical skid detector, now shown, will not cause current to flow into the solenoid 36 of the electromagnetic valve 12, whereby the valve 37 stays on the valve seat 44 to close the valve port 62 by the spring 38 as shown in FIG. 2. Therefore, the vacuum pressure within the conduit 42 is supplied into the first chamber 34 through a gap between the valve seat 63 and an upper end surface of the valve 37, the hole 45 of the valve 37, valve chamber 40 and the passage 43. While as the second chamber 35 is constantly in communication with the vacuum source through the one-way valve 13, there is no pressure difference between the chambers 34 and 35. Therefore the diaphragm piston 31 is urged leftward in FIG. 1 by the biasing force of the spring 33 thereby causing the plunger 25 to move leftward. In consequence, the cut-off valve 24 is opened and the hydraulic pressure within the master cylinder, not shown, is supplied to the wheel cylinders, also not shown, through the inlet port 20, the cut-off valve 24, the pressure chamber 28 and the outlet port 17 thus applying a braking action to the wheels.

Figure 5:
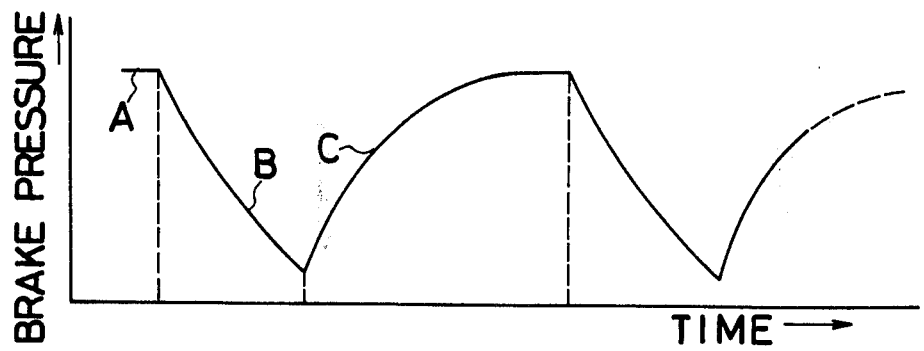
FIG. 5 is a graphical representation showing variations in the brake pressure as a function of time.

FIG. 5 is a graph showing the relationship between brake pressure in the wheel cylinder and time. The relationship between brake pressure and time in case of the normal braking operation as described hereinbefore is shown at A in FIG. 5.

When the force on the brake pedal is excessively great or the value of the adhesive coefficient $\mu$ between the tires and the road surface is smaller than desired the wheels may become locked or likely to be locked and the detector energizes the solenoid 36 to attract the valve 37 upward in FIG. 2 against the spring 38. Therefore, the valve 37 separates from the valve seat 44 and comes in contact with the valve seat 63 to open the valve port 62. In consequence, the communication between the conduit 42 and the valve chamber 40 is interrupted and communication between the air inlet port 39 and the valve chamber 40 is established, whereby atmospheric pressure is supplied into the first chamber 34 of the servomotor 11 through the air inlet port 39, the air cleaner 41, the valve port 62, a gap between the valve seat 44 and the valve 37, the valve chamber 40 and the passage 43. Consequently, pressure within the first chamber 34 is raised from a vacuum level to an atmospheric pressure level, thereby creating a pressure difference between the first chamber 34 and the second chamber 35. This causes displacement of the diaphragm piston 31 to the right from the position shown in FIG. 1 against the force of the spring 33. Thus, according to this displacement of the diaphragm piston 31 to the right, the plunger 25 is urged to the right due to the pressure within the pressure chamber 28 such that the plunger 25 separates from the valve ball 22 so that the valve ball 22 is urged toward the valve seat 21 by the force of the spring 23, that is, the cut-off valve 24 is closed, whereby communication between the inlet port 20 and the outlet port 17 is interrupted. With the further movement of the plunger 25 to the right, the volume of the pressure chamber 28 increases. As a result, pressure within the wheel cylinder is lowered, as shown by the curve B in FIG. 5, to a level low enough to release the brake pressure, whereby the wheel is again free to rotate.

In the foregoing brake pressure reducing operation, the displacement of the diaphragm piston 31 to the right causes a decrease in the volume of the second chamber 35 to thereby increase the pressure within the second chamber 35. Thus, the valve 53 of the one-way valve 13 is urged upward in FIG. 4 against the spring 55 to thereby separate the seat 54 from the seat surface 56 for large and rapid vacuum pressure communication between the second chamber 35 and the chamber 50. Therefore, the rightward displacement of the diaphragm piston 31 is not interfered with by the increase of the pressure within the second chamber 35.

When the wheel restores its rotation, the solenoid 36 of the electromagnetic valve 12 becomes deenergized, and the valve 37 returns to the position shown in FIG. 2 by the force of the spring 38 to interrupt the communication between the air inlet port 39 and the first chamber 34, while estabishing communication between the first chamber 34 and the conduit 42. Consequently, vacuum pressure is introduced into the first chamber 34, thereby lowering a level of pressure in the chamber 34, thus reducing the pressure difference between the first and second chambers 34 and 35. As a result, the diaphragm piston 31 is urged to the left in FIG. 1 by the force of the spring 33 according to the degree of the decrease of the pressure difference. With the leftward movement of the diaphragm piston 31, the plunger 25 is urged leftward, thereby reducing the volume of the pressure chamber 28, so that the pressure in the wheel cylinder is raised, and thus, the brake pressure starts increasing. When the cut-off valve 24 is fully opened due to the further leftward displacement of the plunger 25 hydraulic pressure is supplied from the master cylinder to the wheel cylinder, whereby the brake pressure is completely restored.

In the foregoing brake pressure restoring operation, the second chamber 35 communicates with the conduit 42, i.e. a vacuum source (not shown) communicates with the second chamber 35 by way of the orifice 60 of the valve 53 only, so that introduction of vacuum pressure to the second chamber 35 is limited, while the volume of the second chamber 35 is increased with the leftward movement of the diaphragm piston 31. Thus, vacuum in the second chamber 35 is increased according to the degree of the increase of the volume of the second chamber 35, thereby lowering the level of pressure within the chamber 35, as a result of which a pressure difference between the first and second chambers 34 and 35 increases. The pressure difference thus increased between the two chambers 34 and 35 acts to move the diaphragm piston 31 to the right against the force of the spring 33. Thus, the rise in pressure in the wheel cylinder is rapid at the commencement of the brake pressure restoring operation and after that becomes gradually slower as shown by the curve C in FIG. 5. Therefore, the wheel is prevented from being rapidly brought to the locked condition again as a result of the brake pressure-restoring operation.

Through the leftward movement of the diaphragm piston 31, the cut-off valve 24 is eventually turned to a full open position and pressure in the master cylinder is transmitted to the wheel cylinder, so that the brake pressure is completely restored, thereby permitting the normal brake action. If the wheel is again locked or is about to be locked, then the brake-pressure-reducing operation and the brake pressure-restoring operation are repeated to thereby effect the anti-skid control action. Thus, a motor vehicle is permitted to safely stop without locking the wheel.

Obviously, numerous modifications and variations of the present invention are possible in light of the above teachings. It is to be understood therefore that within the scope of the appended claims, the present invention may be practiced otherwise than as specifically described herein.

What is claimed is:
1. An anti-skid brake control assembly for a vehicle comprising:
 a hydraulic controller including an inlet port connected to a master cylinder generating hydraulic pressure, an outlet port connected to at least one wheel cylinder of a wheel, cut off valve means disposed between said inlet and outlet ports for selectively blocking the communication therebetween, a pressure chamber disposed between said cut off valve means and said outlet port, and plunger means slidably disposed within said pressure chamber for varying the volume of said pressure chamber, said plunger means being operatively connected at one end thereof to said cut off valve means to thereby urge said cut off valve means to its open position when the volume of said pressure chamber is minimal;
 servo means including a casing, diaphragm piston means dividing said casing into a first chamber and a second chamber, said diaphragm piston means being displaceable due to a pressure difference between said first and second chambers and being operatively connected to the other end of said plunger means, and biasing means disposed within said second chamber for normally urging said diaphragm piston and said plunger means in that direction in which said plunger means decreases the volume of said pressure chamber;
 valve means for communicating said first chamber with a low pressure source through conduit means when the normal braking action is applied, and for communicating said first chamber with a high pressure source when the wheel is locked in or about to be locked;
 restricting means communicating said conduit means with said second chamber; and
 one way valve means permitting unrestricted free flow from said second chamber to said conduit means.
2. An anti-skid brake control assembly according to claim 1, wherein said restricting means is an orifice.
3. An anti-skid brake control assembly according to claim 2, wherein said one way valve means comprises:
 a casing;
 a valve chamber provided within said casing;
 a first passage for communicating said valve chamber with said low pressure source;
 a second passage for communicating said valve chamber with said second chamber;
 a valve seat interposed between said valve chamber and said second passage;
 a valve member disposed within said valve chamber and engaging and disengaging with said valve seat to interrupt and establish free flow communication between said valve chamber and said second chamber, said valve member being provided with said orifice for continuously and restrictedly communicating said valve chamber with said second passage; and
 biasing means disposed within said valve chamber for normally urging said valve member toward said valve seat.

* * * * *